March 3, 1970 M. R. DILLING ET AL 3,498,571

TAPE REEL DRIVE SYSTEM

Filed Aug. 13, 1968 2 Sheets-Sheet 1

INVENTORS:
MARION R. DILLING
BY JOHN O. RENN
Christensen, Sanborn, + Matthews
ATTORNEYS INVENTORS:
MARION R. DILLING
JOHN O. RENN
BY Christensen Sanborn & Matthews
ATTORNEYS United States Patent Office 3,498,571

Patented Mar. 3, 1970

3,498,571

TAPE REEL DRIVE SYSTEM

Marion R. Dilling and John O. Renn, Seattle, Wash., assignors to Interface Mechanisms, a limited partnership of Washington Filed Aug. 13, 1968, Ser. No. 752,338
Int. Cl. G11b *15/22;* F16h *21/18*
U.S. Cl. 242—203 13 Claims

ABSTRACT OF THE DISCLOSURE

This application discloses a tape drive system including planetary gear arrangements associated with the tape supply and tape take-up reels such as used in perforated or printed tape systems. A differential drive mechanism is disclosed as including a planetary gear cluster associated with the supply reel and the take-up reel with the reels being carried by the planet gears and the ring gears being driven at a substantially constant speed. The sun gear is mounted on the shaft of a shaded pole AC motor which is selectively energized with direct current to provide a brake action and hence a selected proportional torque on the planet gears in response to the ring gear drive. An unbalance in tape tension caused by a tape feed operation results in a smooth take-up of tape at various speeds. Operating details as well as illustrative embodiments of the gear drive systems are provided.

SUMMARY OF THE INVENTION

Various types of data recording and data playback systems utilize an elongated tape member as the record medium and therefore much effort has been devoted to providing high-speed and accurate tape handling devices. In general the systems most widely used at the present time incorporate a tape supply reel and a tape storage reel together with a selectively operated drive mechanism for stripping material from the supply reel and winding the same on the take-up reel after the tape passes through a read or record station. In many systems a bi-directional drive arrangement is required so that tape can be stripped from or stored on either of the two reels. In many applications it is desirable to have the ability to move the tape at a high speed, yet care must be exercised in the design of the equipment to avoid the application of forces to the tape which are sufficient to cause tearing of the tape material.

It is an object of the present invention to provide a tape drive system which includes a take-up reel adapted to be automatically operated in response to a change in the tension of the tape being wound on the reel.

Another object of the present invention is to provide a tape supply and tape take-up system utilizing planetary gear systems in combination with shaded pole motor brake assemblies for assuring smooth tape feed opreations at various speeds.

Another object of the present invention is to provide a tape take-up system which is compatible with and serves as part of a tape movement system wherein the tape is moved intermittently by short distances at high stepping rates, and wherein the same supply and storage system automatically adjusts to highspeed non-intermittent drive modes of operation.

In accordance with the teachings of the present invention a tape supply reel is carried by the planet gears of a planetary gear cluster with the associated ring gear being driven at a substantially constant speed. The sun gear for the planetary gear cluster is mounted on the shaft of a shaded pole electric motor so that the rotational speed of the reel is effectively dependent on the differential speeds of rotation between the ring and sun gears. Through the application of a control current to the electric motor the motor acts as a brake system with the degree of braking action being adjusted such that a selected force is applied to the tape being wound on the take-up reel even during times when no tape movement is occurring. This force is lower than that which would result in tearing of the tape material and is readily adjusted by adjustment of the substantially constant current applied to the brake motor.

An independent tape drive device such as a pinch roller is associated with the tape being fed on to the take up reel. A tape brake system normally holds the tape against the advancing force of the take-up reel until such time as the pinch roller is engaged with the tape. At this time the brake is released and the tape is advanced toward the take-up reel by the pinch roller. The resulting decrease in tension of the tape causes the planet gear carrier to undergo rotation in response to the ring gear drive, the sun gear velocity being reduced automatically. The take-up reel is then rotated until such time as the tape brake is again engaged causing the tape tension to increase to a point such that the drive force being applied by the differential drive assembly again exceeds its maximum capability and a state of equilibrium is again reached.

In one embodiment of the invention a tape supply reel is provided with a drive and control system substantially identical to that described above for the take-up reel and hence a bidirectional tape supply system is provided. In addition, the use of the indicated differential drive system on the supply reel assembly to cause a braking action to be applied thereto at the end of a highspeed tape feed operation to prevent over-rotation of the supply reel.

The above as well as additional advantages and objects of the invention will be more clearly understood from the description when read with reference to the accompanying drawings.

Figures 1, 2, 3:
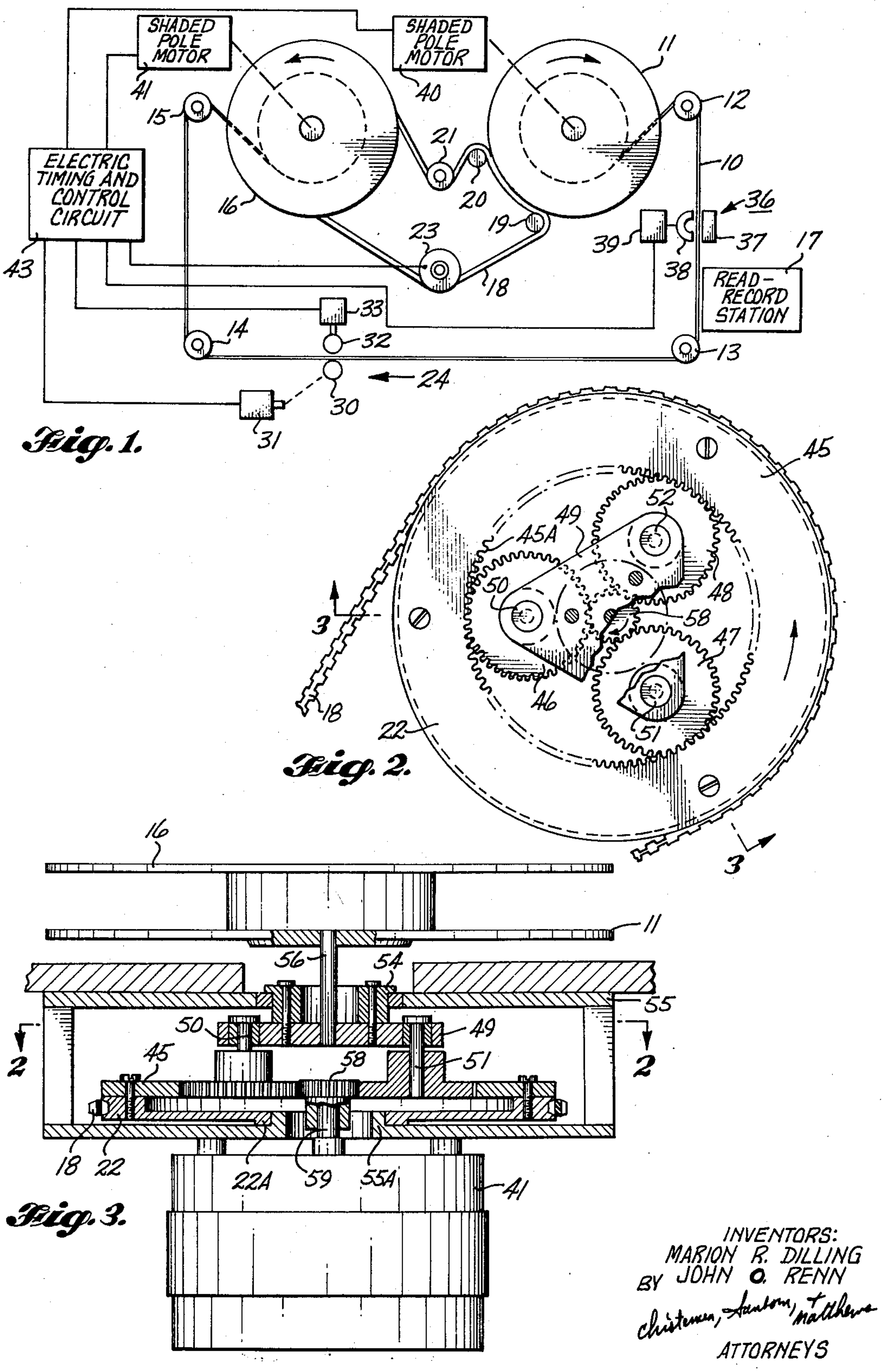
FIGURE 1 is a diagrammatic plan view of one preferred embodiment of the tape drive system.
FIGURE 2 is an enlarged plan view of the differential drive gears associated with the take-up reel and the supply reel in the system of FIGURE 1.
FIGURE 3 is a cross sectional view along the lines 3—3 of FIGURE 2 showing the relationship of the gears in the differential drive assembly.

Turning now to the drawings and in particular to FIGURE 1 the preferred embodiment of the present invention is illustrated as being utilized in a tape printing system wherein a paper tape 10 stored on a supply reel 11 passes over the guidance rollers 12, 13, 14 and 15 and is then wound onto the take-up reel 16 after passing the read-record station 17. The station 17 per se forms no part of the present invention and for example can be a printing or perforating station together with an optical reading station for reading the data printed on the tape. A magnetic read-record station together with a suitable magnetic tape could also make use of the teachings of the present invention.

In the system of FIGURE 1 a geared belt 18 passes around guidance rollers 19, 20 and 21 in a manner such that the geared belt 18 is maintained in constant engagement with the outer geared edge of a ring gear assembly 22 in the differential drive mechanisms associated with the supply and take-up reels 11 and 16 described in greater detail hereinafter. The geared drive belt 18 is driven at a substantially constant speed by the electric drive motor 23. The belt 18 is geared on both sides and is arranged in the pattern indicated in FIGURE 1 so that the supply reel 11 will be rotated clockwise and the take-up reel 16 will be rotated counterclockwise.

As described in detail below, the drive and brake assemblies associated with the take-up and supply reels 16 and 11 respond to a change in the tension of the tape 10. The system includes a tape drive roller 30 driven by the electric motor 31 with a pinch roller 32 being selectively moved toward the drive roller 30 by the electric actuator 33 for causing tape movement. Pinch roller assemblies of the type used for driving the tape are well known and readily available and hence further details thereof are not included. A tape brake system 36 including the stationary block 37 and the movable block 38 actuated by the electric actuator 39 serves to provide a braking action on the tape 10 at selected times and is normally engaged with the tape 10 when the tape is not undergoing a feed operation. A pair of shaded pole electric motors 40 and 41 are respectively associated with the tape supply and take-up reel drive assemblies and are shown as being under the control of the electric timing and control circuit 43 which also controls the pinch roller assembly and the brake assembly. As is common in the art, the control circuit can be selectively operated for reversing the direction of rotation of the tape drive roller 30. The direction of rotation of the output shaft of the gear belt drive motor 23 need not be changed since energization of motor 40 will cause tape take-up by reel 11. That is, the system inherently responds to a decrease in tape tension at either reel when the motors 40 and/or 41 are energized. Therefore, as discussed below, the system achieves bi-directional tape drive and take-up in a unique and advantageous manner.

Turning now to FIGURE 2, the details of the drive and brake assembly associated with the take-up reel 16 of FIGURE 1 will be described. An identical apparatus is associated with the supply reel 11. As seen in FIGURES 2 and 3 the gear 22 engaged by the geared belt 18 is bolted to and forms an integral part of a ring gear 45 having internal teeth 45A engaged with the teeth of the three planet gears 46, 47 and 48 carried by the planet gear carrier 49. The planet gears are supported for rotation on the planet gear frame 49 by means of the individual gear shafts 50, 51 and 52 and associated bearing systems illustrated in FIGURE 3. The planet gear carrier 49 is in turn secured to the bearing 54 which rides on the support frame 55 in a manner such that the planet gear carrier is rotatable within the frame 55. The shaft 56 carried by the planet gear carrier 49 and rigidly secured thereto carries the take-up reel 16, the arrangement being such that the take-up reel 16 moves with the planet gear carrier 49.

A sun gear 58 is secured to the output shaft 59 of the shaded pole motor 41 and is engaged with each of the three planet gears 46, 47 and 48. While the system is illustrated as making use of three planet gears it will of course be evident that a different number of planet gears intermediate the sun and ring gears can be utilized. The bearing surface 22A and hub section 55A serve to mount the ring gear 45 on the support frame 55 with its center of rotation being coincident with the center of the sun gear 58.

The operation of the differential drive mechanism of FIGURES 2 and 3 is as follows. Assuming the shaded pole motor 41 to have no energizing current applied thereto and assuming the planet gear carrier 49 to be held against any rotation by virtue of the brake assembly 36 holding the tape 10 against movement, it will be seen that as the ring gear 45 is driven counterclockwise at a constant speed the sun gear 58 will be driven clockwise at a speed which is dependent on the gear ratios of the system. In the specific system illustrated a six-to-one ratio exists between the ring gear and the sun gear and hence that would determine the relative rotational speed between these two gears when the planet gear carrier 49 is held stationary. Due to the frictional forces inherent in such gear assemblies the planet gear carrier 49 would be urged in a counterclockwise direction by a small force even under conditions when the shaded pole motor 41 has no energizing current applied thereto.

Now assuming that an energizing current in the form of a DC current is applied to the shaded pole motor 41, it will be seen that the rotation of the armature secured to the output shaft of motor 41 would interact with the field caused by the DC current so that an electromagnetic braking action would result. This braking action would tend to slow the gun gear 58 causing a greater driving force to be applied to the planet gear carrier 49. Since the actual rotational speed of the planet gear carrier 49 is a differential function determined by the relative rotational speeds of the ring gear 45 and the sun gear 58, it will be seen that even through the speed of the sun gear 58 would remain the same when the motor 41 is energized and the planet gear carrier 49 is held against rotation, the planet gear carrier 49 would be subjected to an increased force tending to rotate the take-up reel 16 in a counterclockwise direction. This force would be dependent in part on the amount of energizing current applied to the motor 41 and is so selected as to provide the desired tension in the tape 10 under stationary tape conditions.

Assuming the pinch roller 32 is engaged with the tape 10 for a tape-advancement operation it will be seen that the drive applied to the tape 10 by the drive roller 30 (FIGURE 1) causes a momentary reduction in the restraining force on the planet gear carrier 49 so that the driving force being applied thereto in the manner described above causes the take-up reel 16 to wind tape thereon. As a result of the rotation of the planet gear carrier 49 the rotational speed of the sun gear 58 decreases and the effect of the essentially constant current being applied to the motor 41 is reduced. The net output torque provided by the sun gear 58 is also reduced. The speed of the planet gear carrier 49 and the take-up reel 16 therefore increases to a selected value until such time as the tape 10 is restrained against further movement so that the restraining force applied to the planet gear carrier 49 increases. As this occurs the speed of the sun gear increases back to its normal velocity for the above described operating conditions when the planet gear carrier 49 is completely restrained against movement. As a result the initial tension on the tape 10 is reapplied and the system is in a condition for a further tape feed operation. It is of importance to note that the motor 41 is constantly energized by a selected amount of direct current with the actual rotation of the take-up reel 16 occurring in response to a decrease in the tension of the tape 10.

Figure 4:
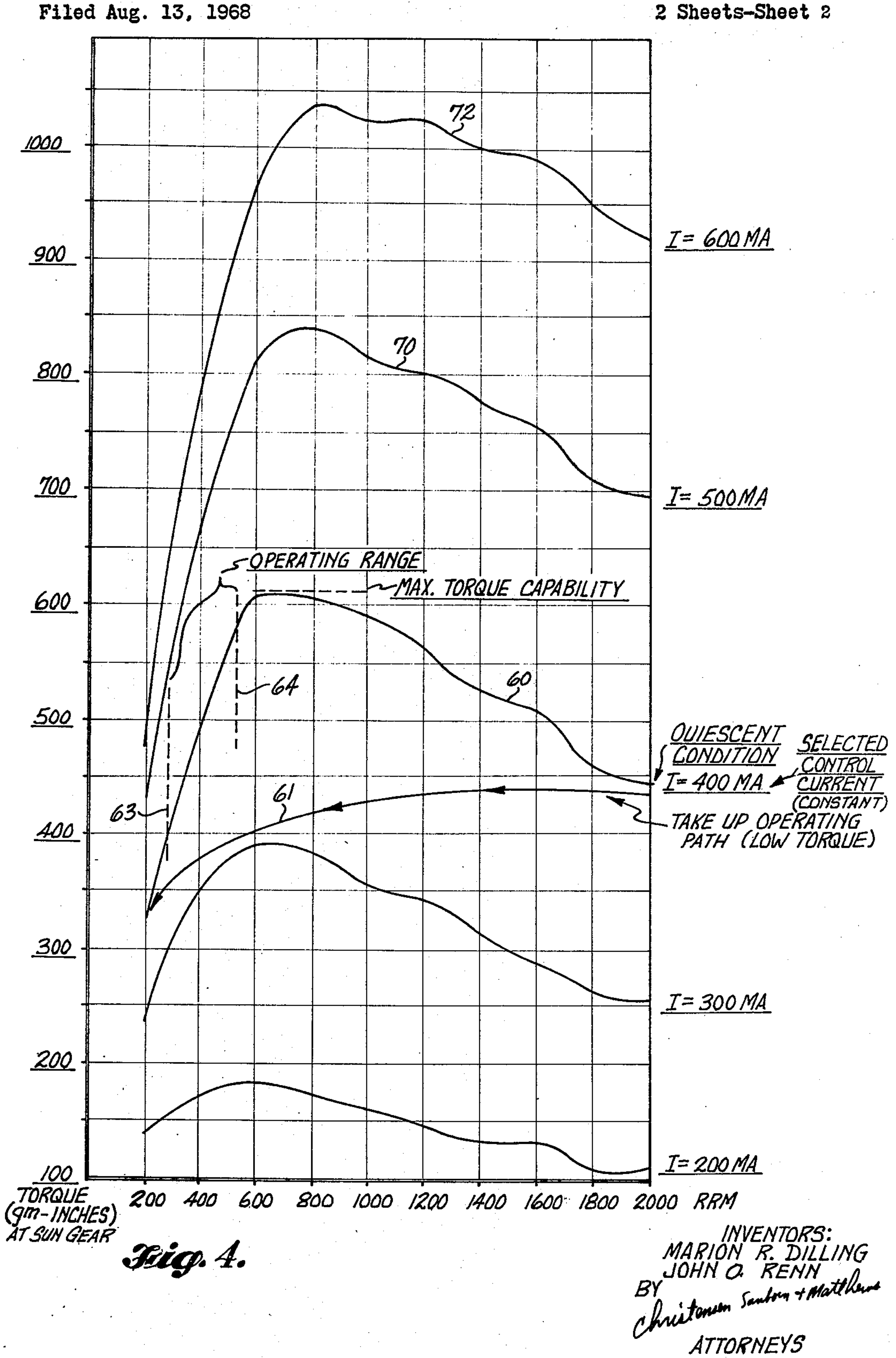
FIGURE 4 is a chart showing the output torque provided by the sun gear in the differential drive mechanism when the associated brake motor is energized by the indicated direct current and further showing the rotational speed of the sun gear for given conditions of current and torque.

Referring now to FIGURE 4 the manner of operation of the system will be more clearly understood by reference to the operating curves illustrated therein for various conditions of energization of the motor 41. It will be seen for example from the operation curve 60 that with a constant input control current of 400 milliamps for the given shaded pole motor 41 the steady state brake torque provided the sun gear 58 is approximately 450 gram-inches. The output torques of the planet carrier is therefore $$(1+C/A)\times\tau_c=2{,}700 \text{ gram-inches}$$

where

A=pitch Dia of ring gear 45A (2.5″)
C=pitch Dia of sun gear 58 (.5″)
$\tau_c$=brake torque of sun gear.

This would be the quiescent operating condition when no tape movement is occurring. Then assuming a tape feed operation with the drive roll 30 and pinch roll 32 assembly serving to drive the tape toward the take-up reel 16. The tension in the tape would be reduced so that the planet gear carrier 49 would undergo rotation in the manner described above. Due to the rotation of the planet gear carrier the velocity of the gun gear would follow the operating curve 61 to a point such that the speed of the sun gear would drop from approximately 2,000 r.p.m. to approximately 200 r.p.m. Thus the planet gear carrier moves quite rapidly from a condition of zero rotation to a condition of relatively high rotational velocity so long as the tension in the tape is below the maximum torque capability of the drive system. Under the illustrated operating conditions of an input current of 400 milliamps the system has an output torque capability of 3,600 grams-inches. Thus the system would operate under dynamic conditions within the operating range illustrated between vertical lines 63 and 64 for the operation·curve 60.

When the tape feed operation terminates and the tape is again restrained against further take-up on the reel 16, a maximum rotational speed of the sun gear increases to its initial condition of approximately 2,000 r.p.m. It is of importance to note that during this change in rotational speed the output torque provided by the sun gear first increases and then decreases after having reached its maximum capability of approximately 600 gram-inches. It then returns to the quiescent condition of providing a torque of approximately 450 gram-inches. Thus the tension in the tape is maintained at a lower value during quiescent conditions than is actually achieved during completion of the feed operation and hence accurate take-up is achieved.

It will be seen from FIGURE 4 that the output torque on the sung gear 58 is easily adjusted by adjusting the constant current applied to the shaded pole motor. For example using the same motor and differential gear system the application of 500 milliamps of constant current rather than 400 milliamps of constant current changes the operating curve to correspond to that illustrated by curve 70 wherein the maximum sun gear or braking torque is 850 gram-inches which results in a system output torque of 6×850 or 5,100 gram-inches. A further factor of importance in the system is seen by comparing the curves 60 and 70 of FIGURE 4 in that the operating portion 70A of the higher current curve 70 is relatively steep by comparision to the corresponding section of curve 60. Relating this to the actual system operation, it is found that the time to get from zero tape movement to highspeed take-up is dependent on the magnitude of the current applied to the motor 41. Therefore in operating the system it is found that by applying a higher current to the motor the time required for the take-up reel to achieve top speed is reduced. Accordingly the electric timing and control circuit is adjusted such that a relatively low current (such as indicated by curve 60 of FIGURE 4) is applied to motor 41 during stepwise feeding of the tape since there is no need for the take-up reel to achieve a high rotational speed. However, in the case of a continuous feed with the pinch roller 32 engaged with the drive roller 30 for a sustained period of time the current to the motor 41 is elevated to a value such as that indicated by curve 72. As a result the take-up reel achieves its maximum speed in a very short time and hence the possibility of an excess of tape building up ahead of the take-up reel is avoided.

In the system of FIGURE 1 the supply and take-up reels each have the apparatus of FIGURES 2 and 3 associated therewith so that bi-directional drive is achieved under control of the control circuit 43. It will be seen that reels 11 and 16 are both constantly urged in a tape take-up direction by the planetary gear drive system and that energization of the shaded pole motors is all that is needed for the take-up operation. During intermittent or low-speed drive of the tape 10 it is found in practice that the reel acting as the supply reel need not provide any significant restraining force and hence the motor 40 associated with the differential drive mechanism would not be energized. Similarly during a higspeed tape movement for a sustained period there would be no need to energize the motor 40 in the supply reel control arrangement since the frictional forces of the differential gear arrangement prevents over-rotation of the supply reel during the actual tape movement. However, near the end of a highspeed tape feed operation the supply reel motor 40 is momentarily energized by a pulse of relatively low magnitude current so that a braking force is developed thereby preventing the throwing of a loop of tape. It is also found that during a highspeed tape feed operation it is only necessary to provide the high value of current to the take-up motor 41 for a short period of time while the speed is building up. Thereafter the current can be reduced so that excess tension in the tape is avoided as the tape feed operation is terminated. The sequence of the applicaion of control signals to the various electric devices in the system of FIGURE 1 is such that the brake assembly 36 is normally in its tape-holding mode, but is released simultaneously with engagement of the pinch roller with the drive roller 30 so that the tape is free to move. Then as the pinch roller assembly is disengaged the brake is re-engaged with the tape to prevent tape flutter.

The speed versus torque characteristic of the shade pole motor provides smooth braking from a highspeed reeling operation. As the motor armature r.p.m. increases above 2,000 r.p.m. the braking torque continues to decrease for a given control current. When tape is being stripped from the supply reel, its effective diameter decreases and the sun gear r.p.m. increases from the quiescent operating point (2,000 r.p.m.). Therefore when control current is applied to the supply motor the output torque starts from a very low value and increases to the quiescent torque for the selected current.

While the invention has been disclosed by reference to the presently preferred embodiment thereof, it will be recognized that certain changes and modifications will become obvious to a person skilled in the art as a result of the teachings hereof. It is intended that such changes will be encompassed by the following claims.

What is claimed is:

1. A tape take-up system comprising in combination: a planetary gear cluster having first, second, and third gear means including a sun gear, a ring gear, and a plurality of planet gears disposed between and engaged with said sun and planetary gears; a take-up reel secured to said first gear means; drive means connected to said second gear means and rotating said second gear means at a predetermined velocity; and dynamic brake means coupled with said third gear means and providing a yielding braking torque thereto.

2. The system as defined in claim 1 wherein said first gear means includes said planet gears.

3. The system as defined in claim 2 wherein said second gear means includes said ring gear.

4. The system as defined in claim 3 wherein said dynamic brake means includes a shaded pole motor having its output shaft coupled to said sun gear.

5. The system as defined in claim 4 including means providing a selected substantially constant current to said motor.

6. A tape take-up apparatus comprising in combination: a tape holding take-up reel; a set of planetary gears including a sun gear, a ring gear and a plurality of planet gears disposed between and engaged with said sun and ring gears; support means connected to said planet gears and to said reel and causing said reel to rotate with the movement of said planet gears about said sun gear; power input means connected to said ring gear and operative to rotate said ring gear in a direction to cause take-up of material on said reel when said sun gear is stationary; and brake means connected to said sun gear applying a predetermined yielding restraining force on said sun gear such that said sun gear rotates at a first speed when no tape is being wound on said reel and at a second speed when tape is being wound on said reel.

7. The apparatus defined in claim 6 wherein said brake means includes a shaded pole electric motor.

8. A tape supply and take-up system comprising in combination: first and second planetary gear clusters each including a sun gear, a ring gear, and a plurality of planet gears disposed between the sun and ring gears; first and second tape reels respectively secured to a first one of the gears in said first and second gear clusters; first and second shaded pole motors respectively coupled with a second gear in said first and second gear clusters and operative when energized to provide a braking torque which yieldingly inhibits rotation of the associated gear; drive means coupled with a third one of the gears in each of said clusters and operative to simultaneously rotate each said third gear in a direction tending to wind tape on each reel; and tape drive means selectively engageable with a tape extending from one of said reels to the other and selectively operable to advance tape toward a selected one of said reels.

9. The system of claim 8 wherein the said first one gears include the planet gears of each of said gear clusters.

10. The system of claim 9 wherein said shaded pole motors are respectively coupled with said sun gears.

11. The system of claim 10 including current control means selectively energizing one of said motors with a substantially constant direct current and the other with a pulse of current near the end of a tape feed operation.

12. The system of claim 11 wherein said current control means includes means selectively increasing the magnitude of said substantially constant current during a high-speed tape feed operation.

13. The system of claim 10 including tape brake means engageable with a tape extending from one of said reels to the other and selectively operable to prevent tape movement therebetween.

References Cited

UNITED STATES PATENTS

| | | | |
|---|---|---|---|
| 2,743,878 | 5/1956 | Masterson | 242—55.12 |
| 2,938,677 | 5/1960 | Flan et al. | 242—55.12 |
| 3,289,961 | 12/1966 | Glenn | 242—55.12 |

LEONARD D. CHRISTIAN, Primary Examiner

U.S. Cl. X.R.

74—750